United States Patent
Tao et al.

(10) Patent No.: US 9,305,332 B2
(45) Date of Patent: Apr. 5, 2016

(54) CREATING DETAILS IN AN IMAGE WITH FREQUENCY LIFTING

(71) Applicant: Samsung Electronics Co., Ltd., Suwon-si, Gyeonggi-do (KR)

(72) Inventors: Li Tao, Irvine, CA (US); Yeong-Taeg Kim, Irvine, CA (US)

(73) Assignee: Samsung Electronics Company, Ltd., Suwon-si (KR)

( * ) Notice: Subject to any disclaimer, the term of this patent is extended or adjusted under 35 U.S.C. 154(b) by 60 days.

(21) Appl. No.: 14/214,056

(22) Filed: Mar. 14, 2014

(65) Prior Publication Data

US 2014/0270564 A1 Sep. 18, 2014

Related U.S. Application Data (60) Provisional application No. 61/794,627, filed on Mar. 15, 2013, provisional application No. 61/892,332, filed on Oct. 17, 2013.

(51) Int. Cl.
*G06K 9/40* (2006.01)
*G06T 3/40* (2006.01)

(52) U.S. Cl.
CPC ................... *G06T 3/4053* (2013.01)

(58) Field of Classification Search
CPC ........... G06T 5/00; G06T 5/001; G06T 5/003; G06T 5/20; G06T 5/40; G06T 5/50; G06T 11/001; H04N 5/265
See application file for complete search history.

(56) References Cited

U.S. PATENT DOCUMENTS

| | | | |
|---|---|---|---|
| 5,231,677 A | 7/1993 | Mita et al. | |
| 5,517,687 A * | 5/1996 | Niehenke et al. | 455/325 |
| 6,266,443 B1 | 7/2001 | Vetro et al. | |
| 6,716,175 B2 | 4/2004 | Geiser et al. | |
| 6,985,636 B1 | 1/2006 | Semenchenko | |
| 7,068,817 B2 | 6/2006 | Bourg et al. | |
| 7,139,036 B2 | 11/2006 | Wang et al. | |
| 7,203,381 B2 | 4/2007 | Motomura | |
| 7,221,761 B1 | 5/2007 | Deshpande et al. | |
| 7,292,733 B2 | 11/2007 | Monobe et al. | |
| 7,302,112 B2 * | 11/2007 | Shimazaki et al. | 382/266 |
| 7,315,656 B2 * | 1/2008 | Von Thal et al. | 382/254 |
| 7,362,900 B2 | 4/2008 | Urano et al. | |

(Continued)

FOREIGN PATENT DOCUMENTS

| | | |
|---|---|---|
| EP | 2416557 A1 | 2/2012 |
| KR | 1020110032402 A | 3/2001 |

(Continued)

OTHER PUBLICATIONS

International Search Report and Written Opinion dated Jul. 22, 2014 for International PCT Application No. PCT/KR2014/002246 from Korean Intellectual Property Office, pp. 1-9, Daejeon, Republic of Korea.

(Continued)

*Primary Examiner* — Amir Alavi
(74) *Attorney, Agent, or Firm* — Sherman IP LLP; Kenneth L. Sherman; Steven Laut (57) ABSTRACT

Input image information is received. Enhancement information is determined based on frequency characteristics of the input image information. The enhancement information is mixed with the input image information to generate an enhanced image.

34 Claims, 8 Drawing Sheets

(56) References Cited

U.S. PATENT DOCUMENTS

| | | | |
|---|---|---|---|
| 7,587,099 B2 | 9/2009 | Szeliski et al. | |
| 7,702,175 B2 * | 4/2010 | Yazaki et al. | 382/266 |
| 7,817,872 B2 | 10/2010 | Michel et al. | |
| 7,885,486 B2 | 2/2011 | Kubota et al. | |
| 8,107,765 B2 | 1/2012 | Hwang et al. | |
| 8,175,385 B2 | 5/2012 | Steinberg et al. | |
| 8,213,737 B2 | 7/2012 | Steinberg et al. | |
| 8,233,744 B2 | 7/2012 | Tezuka | |
| 8,254,726 B2 | 8/2012 | Ichihashi et al. | |
| 8,260,087 B2 | 9/2012 | Messing et al. | |
| 8,335,394 B2 | 12/2012 | Zhu et al. | |
| 8,406,572 B2 * | 3/2013 | Kabasawa | 382/300 |
| 8,428,386 B2 * | 4/2013 | Yoshimura et al. | 382/266 |
| 8,433,148 B2 | 4/2013 | Porikli et al. | |
| 8,442,337 B2 | 5/2013 | Zuo et al. | |
| 8,452,110 B2 | 5/2013 | Carmel et al. | |
| 8,472,724 B2 | 6/2013 | Lertrattanapanich et al. | |
| 8,472,745 B2 | 6/2013 | Kameyama | |
| 8,494,227 B2 | 7/2013 | Prokoski | |
| 8,531,601 B2 | 9/2013 | Kobayashi | |
| 8,593,542 B2 | 11/2013 | Steinberg et al. | |
| 8,594,448 B2 | 11/2013 | Nachlieli et al. | |
| 8,594,452 B2 | 11/2013 | Chen | |
| 8,666,177 B2 | 3/2014 | Chen et al. | |
| 8,743,963 B2 | 6/2014 | Kanumuri | |
| 8,780,109 B2 | 7/2014 | Hyodo et al. | |
| 8,805,113 B2 | 8/2014 | Moriya et al. | |
| 8,818,109 B2 | 8/2014 | Kisilev et al. | |
| 8,873,835 B2 | 10/2014 | Asente et al. | |
| 8,948,533 B2 | 2/2015 | Golan et al. | |
| 8,983,177 B2 | 3/2015 | Tuzel et al. | |
| 9,031,346 B2 * | 5/2015 | Damkat | 382/254 |
| 9,066,025 B2 * | 6/2015 | Tao et al. | |
| 2004/0136570 A1 | 7/2004 | Ullman | |
| 2006/0050783 A1 | 3/2006 | Le Dinh et al. | |
| 2006/0222258 A1 | 10/2006 | Lertrattanapanich | |
| 2007/0223834 A1 | 9/2007 | Lertrattanapanich | |
| 2009/0034875 A1 | 2/2009 | Park | |
| 2009/0297039 A1 | 12/2009 | Reinpoldt, III | |
| 2010/0183238 A1 | 7/2010 | Ayzenberg et al. | |
| 2010/0322513 A1 | 12/2010 | Xu et al. | |
| 2011/0235939 A1 | 9/2011 | Peterson et al. | |
| 2012/0212573 A1 | 8/2012 | Park | |
| 2012/0219229 A1 | 8/2012 | Springer et al. | |
| 2012/0301049 A1 | 11/2012 | Mori | |
| 2013/0044965 A1 | 2/2013 | Chien et al. | |
| 2013/0208810 A1 | 8/2013 | Shen | |
| 2013/0243313 A1 | 9/2013 | Civit et al. | |
| 2014/0003734 A1 | 1/2014 | Umansky et al. | |
| 2014/0258941 A1 | 9/2014 | Lim et al. | |
| 2014/0267347 A1 * | 9/2014 | Tao et al. | 345/582 |
| 2014/0267922 A1 | 9/2014 | Tao et al. | |
| 2014/0270566 A1 * | 9/2014 | Tao et al. | 382/263 |
| 2015/0003725 A1 | 1/2015 | Wan | |

FOREIGN PATENT DOCUMENTS

| | | |
|---|---|---|
| KR | 1020050047373 A | 5/2005 |
| KR | 1020050048529 A | 5/2005 |
| KR | 1020110117474 A | 10/2011 |
| WO | 2011068360 A2 | 6/2011 |

OTHER PUBLICATIONS

Piao, Y. et al., "Image resolution enhancement using inter-subband correlation in wavelet domain", Proceedings of the 2007 International Conference on Image Processing (ICIP 2007), Sep. 16, 20078-Oct. 19, 2007, pp. 445-448, vol. 1, IEEE, United States.

U.S. Non-Final Office Action for U.S. Appl. No. 14/214,348 mailed Jul. 16, 2014.

U.S. Notice of Allowance for U.S. Appl. No. 14/214,348 mailed Mar. 2, 2015.

International Search Report and Written Opinion dated Jul. 27, 2014 for International PCT Application No. PCT/KR2014/002251 from Korean Intellectual Property Office, pp. 1-8, Daejeon, Republic of Korea.

International Search Report and Written Opinion dated Jul. 7, 2014 for International PCT Application No. PCT/KR2014/002247 from Korean Intellectual Property Office, pp. 1-8, Daejeon, Republic of Korea.

Abramov, A. et al., "Real-time image segmentation on a GPU", Facing the multicore-challenge, Jan. 1, 2010, pp. 131-142, Springer-Verlag, Berlin, Heidelberg.

Tian, J. et al., "A survey on super-resolution imaging", Signal, Image and Video Processing, Feb. 3, 2011, pp. 329-342, vol. 5, Issue 3, Springer-Verlag, United States.

U.S. Non-Final Office Action for U.S. Appl. No. 14/214,081 mailed Aug. 5, 2015.

U.S. Non-Final Office Action for U.S. Appl. No. 14/214,114 mailed Aug. 27, 2015.

U.S. Notice of Allowance for U.S. Appl. No. 14/214,081 mailed Jan. 22, 2016.

U.S. Final Office Action for U.S. Appl. No. 14/214,114 mailed Feb. 5, 2016.

\* cited by examiner

CREATING DETAILS IN AN IMAGE WITH FREQUENCY LIFTING

CROSS-REFERENCE TO RELATED APPLICATIONS

This application claims the priority benefit of U.S. Provisional Patent Application Ser. No. 61/794,627, filed Mar. 15, 2013, and U.S. Provisional Patent Application Ser. No. 61/892,332, filed Oct. 17, 2013, both incorporated herein by reference in their entirety.

TECHNICAL FIELD

One or more embodiments relate generally to ultra-high definition (UD) displays, and in particular, to creating details in lower resolution images with frequency lifting for display on a UD display or device.

BACKGROUND

UD users, such as UD television (UDTV) or other UD display devices have to watch lower resolution content (e.g., standard definition (SD), high-definition (HD), Full HD (FHD), etc., content on UD devices until UD video becomes more prevalent. The image quality of lower resolution frames looks degraded when viewed on UD devices. Regular image upscaling or interpolation is unable to provide sufficient image sharpness and fine details to minimize the image quality degradation.

SUMMARY

One or more embodiments relate to creating image details for an image. In one embodiment, a method comprises receiving input image information. In one embodiment, enhancement information is determined, using a processor device, based on frequency characteristics of the input image information. In one embodiment, the enhancement information is mixed with the input image information to generate an enhanced image. One embodiment comprises an image enhancement device for generating an enhanced image by a process according to the method.

In one embodiment, a system comprises a detail creation module that uses a processor device for: receiving input image information, and determining enhancement information based on frequency characteristics of the input image information. In one embodiment, a mixer module mixes the enhancement information with the input image information to generate an enhanced image.

In one embodiment, a non-transitory computer-readable medium having instructions which when executed on a computer perform a method that comprises receiving input image information. In one embodiment, enhancement information is determined based on frequency characteristics of the input image information. In one embodiment, the enhancement information is mixed with the input image information to generate an enhanced image.

These and other features, aspects and advantages of the one or more embodiments will become understood with reference to the following description, appended claims and accompanying figures.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide for creating image details for an image. In one embodiment, a method comprises receiving input image information. In one embodiment, enhancement information is determined, using a processor device, based on frequency characteristics of the input image information. In one embodiment, the enhancement information is mixed with the input image information to generate an enhanced image. One embodiment comprises an image enhancement device for generating an enhanced image by a process according to the method.

A person skilled in the art would appreciate that the format with which image information is expressed is not critical to some embodiments. For example, in some embodiments, image information is presented in the format of (X, Y), where X and Y are two coordinates that define the location of a pixel in an image. Three-dimensional image information is presented by a format of (X, Y, Z) with related information for color of the pixel. In one embodiment, the three-dimensional image information also includes an intensity or brightness element.

For expository purposes, the term "horizontal" as used herein refers to the horizontal direction seen when viewing the drawing as indicated by the figure designation of "FIG.". The term "vertical" refers to a direction perpendicular to the horizontal as just defined. Terms, such as "above", "below", "bottom", "top", "side", "higher", "lower", "upper", "over", and "under", are defined with respect to the horizontal, as shown in the figures.

The term "image" referred to herein may include a two-dimensional image, three-dimensional image, video frame, a computer file representation, an image from a camera, a video frame, or a combination thereof. For example, the image may be a machine readable digital file, a physical photograph, a digital photograph, a motion picture frame, a video frame, an x-ray image, a scanned image, or a combination thereof. The image may be generated from pixels arranged in a rectangular array. The image may include an x-axis along the direction of the rows and a y-axis along the direction of the columns.

Figure 1:
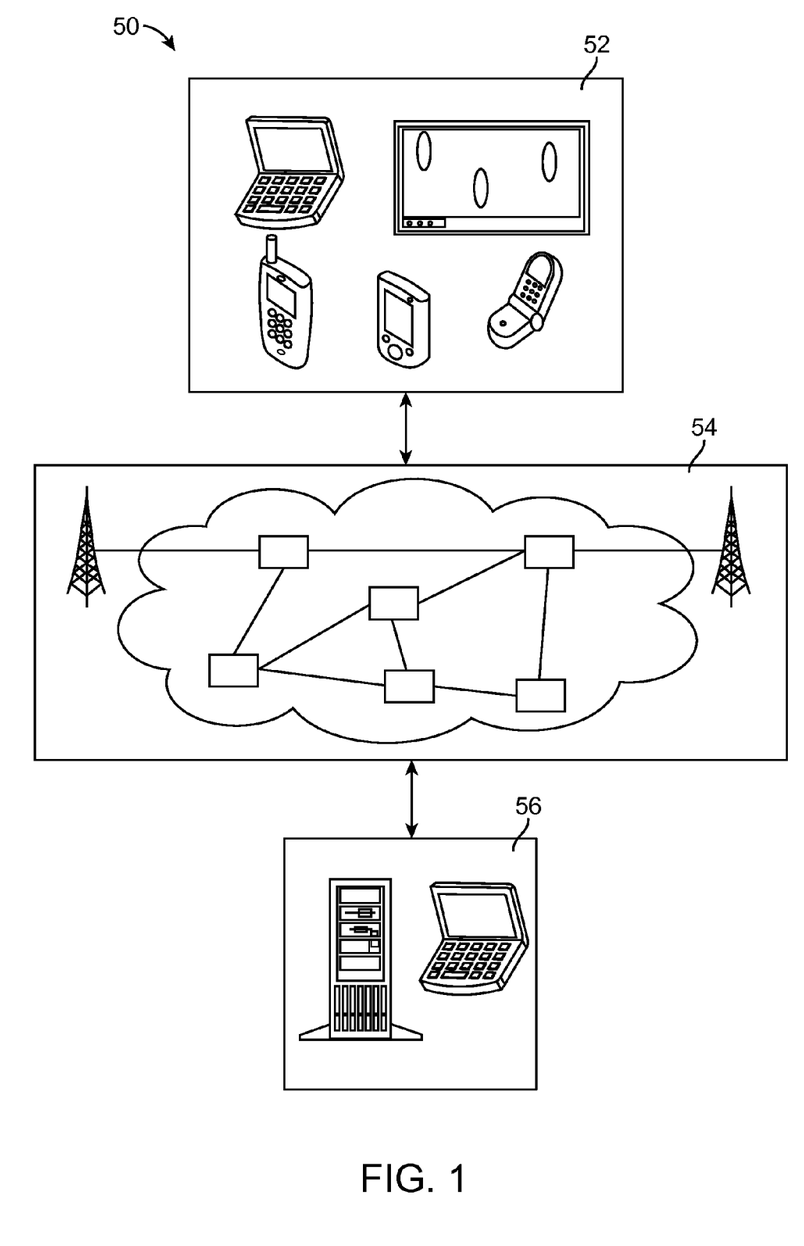
FIG. 1 shows an electronic system with an image details creation mechanism, according to one embodiment.

FIG. 1 shows an electronic system 50 with an image details creation mechanism in one or more embodiments. The electronic system 50 includes a first device 52, such as a client or a server, connected to a second device 56, such as a client or server. The first device 52 may communicate with the second device 56 with a communication path 54, such as a wireless or wired network.

In one example, the first device 52 may be of any of a variety of ultra-high definition (UD) display devices, such as a UD television (UDTV), tablet device, smart phone, personal digital assistant (PDA), a notebook computer, a liquid crystal display (LCD) system, a wearable device, mobile computing device, or other multi-functional displays or entertainment devices. The first device 52 may couple directly or indirectly to the communication path 54 to communicate with the second device 56 or may be a stand-alone device.

For illustrative purposes, the display system 50 is described with the first device 52 as a display device, although it is understood that the first device 52 may be different types of devices. For example, the first device 52 may also be a device for presenting images or a multi-media presentation. A multi-media presentation may be a presentation including sound, a sequence of streaming images or a video feed, or a combination thereof. As an example, the first device 52 may be a UDTV, or any other type of UD display device (e.g., monitor, video panel, HUD, smart telephone, tablet device, video device, gaming device, etc.).

The second device 56 may be any of a variety of centralized or decentralized computing devices, image or video transmission devices. For example, the second device 56 may be a multimedia computer, a tablet, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 56 may be a signal receiver for receiving broadcast or live stream signals, such as a television receiver, a cable box, a satellite dish receiver, or a web enabled device.

The second device 56 may be centralized in a single room, distributed across different rooms, distributed across different geographical locations, embedded within a telecommunications network. The second device 56 may have a means for coupling with the communication path 54 to communicate with the first device 52.

For illustrative purposes, the electronic system 50 is described with the second device 56 as a computing device, although it is understood that the second device 56 may be different types of devices. Also for illustrative purposes, the display system 50 is shown with the second device 56 and the first device 52 as end points of the communication path 54, although it is understood that the display system 50 may have a different partition between the first device 52, the second device 56, and the communication path 54. For example, the first device 52, the second device 56, or a combination thereof may also function as part of the communication path 54.

The communication path 54 may be a variety of networks. For example, the communication path 54 may include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that may be included in the communication path 54. Ethernet, digital subscriber line (DSL), fiber to the home (FTTH), high-definition multimedia interface (HDMI) cable, and plain old telephone service (POTS) are examples of wired communication that may be included in the communication path 54.

Further, the communication path 54 may traverse a number of network topologies and distances. For example, the communication path 54 may include direct connection, personal area network (PAN), local area network (LAN), metropolitan area network (MAN), wide area network (WAN), or a combination thereof.

Figure 2:
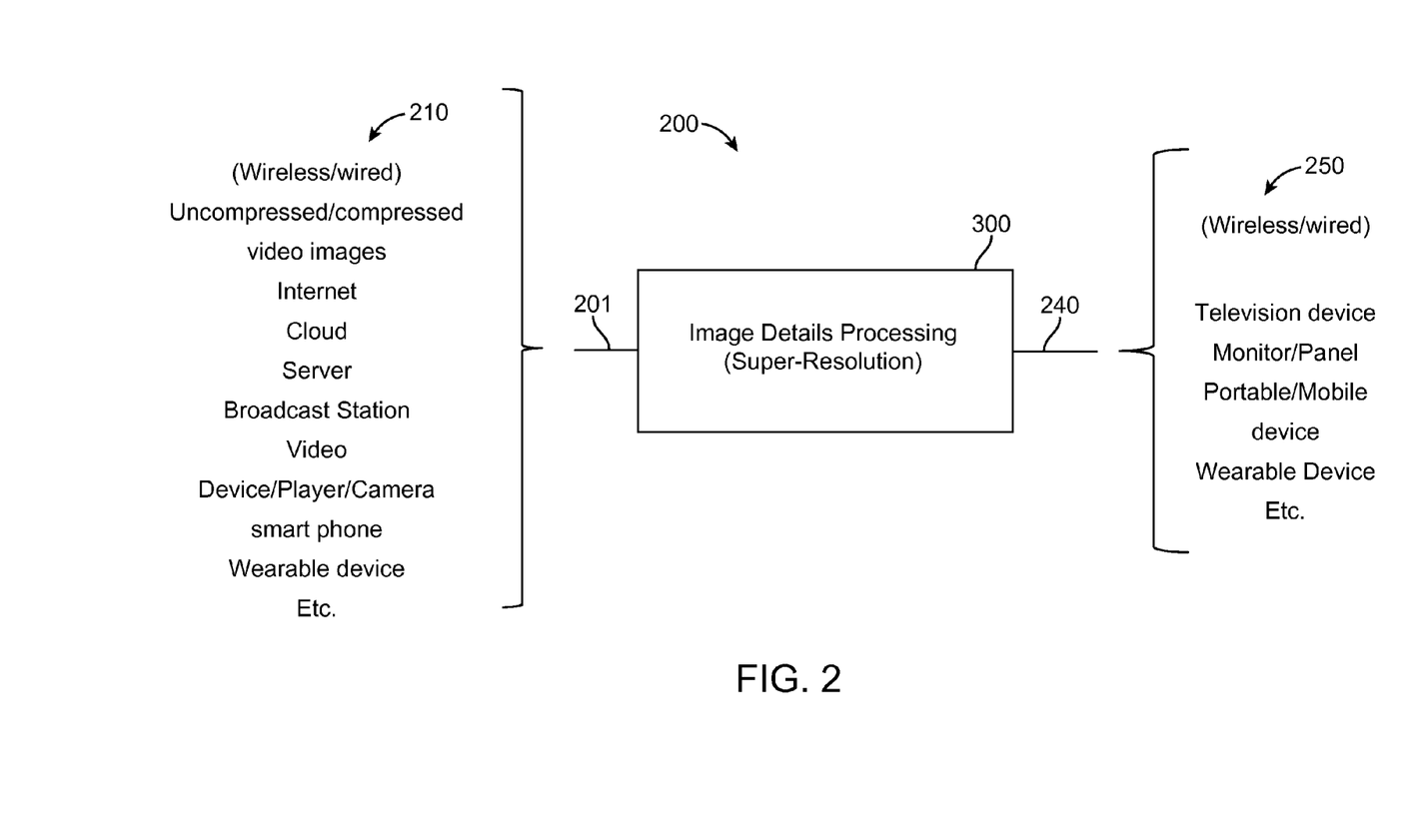
FIG. 2 shows an example high-level block diagram of a system, according to one embodiment.

FIG. 2 shows a high-level block diagram of a system 200, according to one embodiment. In one embodiment, the system 200 may process input video images from an input source 210 received at an input node 201 using an image details processing system 300 (see FIG. 3), output video images at the output node 240 and display the images on an output source 250 (or device 52, FIG. 1). In one embodiment, the image details processing system 300 receives input image information, and determine enhancement information based on frequency characteristics of the input image information. In one embodiment, the enhancement information is then mixed with the input image information to generate an enhanced image.

In one embodiment, the display for an output source 250 (or 52) may be a physical device for presenting the image or multi-media presentations. For example, the display may be a screen, including a liquid crystal display (LCD) panel, a plasma screen, and a projection screen, a heads-up-display (HUD), etc. In other embodiments, the display may be projected on an object or reflection device.

In one embodiment, the input video images may be provided from an input source 210, which may be transmitted/received wirelessly or through a wired interface and may include uncompressed/compressed video content. In one embodiment, wireline or wireless communication of video imaging content in system 200 may include communication on/over one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1 x enhanced voice-data only (EV-DO) or 1 x EV-DO Gold Multicast) system, an IEEE 802.11 system, a DMB (Digital Multimedia Broadcasting) system, an orthogonal frequency division multiple access (OFDM) system, a DVB-H (Digital Video Broadcasting-Handheld) system, etc.

In one embodiment, the video input source 210 may be transmitted over a wireless network (e.g., Internet, local area network (LAN, wide-area network (WAN), personal area network (PAN), campus wireless network (CAN), metropolitan area network (MAN), etc.). In one embodiment, the input source 210 may arise from a cloud-based system, a server, a broadcast station, a video device/player, a video camera, a mobile device, etc.

In one embodiment, the video image input from the input source may be decoded/encoded (e.g., via a decoder/encoder) prior to arriving at the input node 201. In one embodiment, the video image output from the output node 240 to an output source 250 may be encoded/decoded prior to arriving at the output node 240. In one embodiment, the output source 250 may receive the output image from the output node 240 wirelessly or through a wire interface.

In one embodiment, compressed video image content from an input source 210 may provide analog or digital video from a broadcast, computer network, a DVD or other computer readable storage medium, or any other suitable source of video signals. In one embodiment, the compressed video from an input source 210 may be coupled to a receiver via a radio frequency interface (such as ATSC broadcasts), a computer network, or a wired or wireless connection such as a component video cable, a DVI or HDMI video interface, etc. In one embodiment, an uncompressed video image from an input source 210 may include one or more of a video camera, or a memory device such as a disk drive coupled to a receiver by any suitable video interface. In one embodiment, the uncompressed video from an input source 210 may provide uncompressed video in analog or digital form including in the form of luminance and chrominance, in individual color intensities such as red, green and blue, etc., or in any other suitable format.

In one embodiment, digital video formats for input video content from an input source 210 may include different frame rates, different numbers of lines and rows of pixels, interlaced and non-interlaced, etc. For example, movies are typically produced at 24 fps (frames per second) format, NTSC is 30 frames per second and PAL is 25 frames per second. The format may be interlaced or progressive. For example, high definition formats (such as supported by digital video broadcast standards) may be modified to a format that fits the format of a display device of an output source 250. The display device of an output source 250 may be configured to receive NTSC, PAL, ATSC, DVB/T, etc.), or display device running at frame rates, such as 70 Hz, 75 Hz, 80 Hz, etc.

Figure 3:
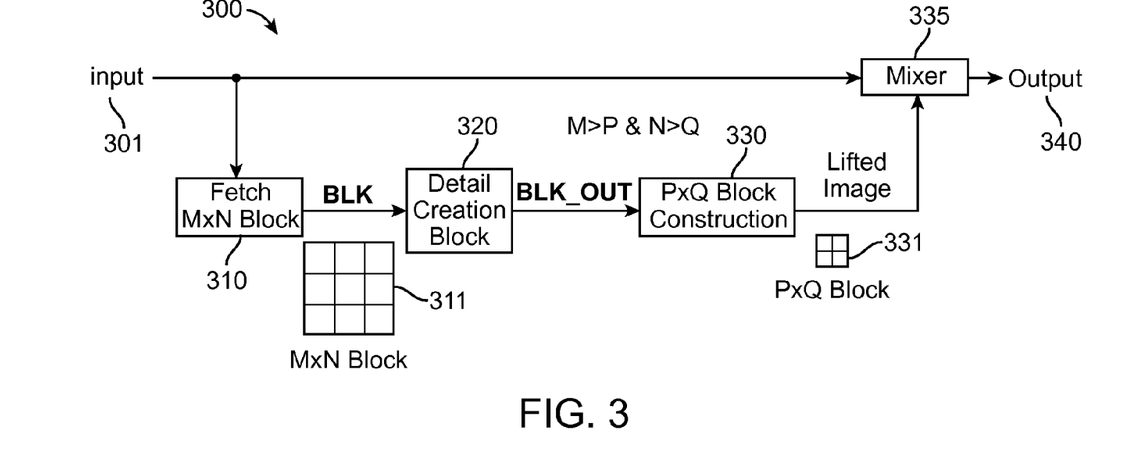
FIG. 3 shows a block diagram of an image details processing system, according to an embodiment.

FIG. 3 shows a block diagram of the image details processing system 300, according to an embodiment. In one embodiment, the system 300 may be implemented in an electronic device, such as the first device 52 (FIG. 1), the second device 56, etc. In one embodiment, the system 300 includes an input node 301, a fetching/receiving module 310, a detail creation module 320, a block construction/combining module 330, a mixer module 335 (for mixing the lifted image details with an input image) and an output node 340.

In one embodiment, block based image processing is implemented to produce the output image at the output node 340, which is a combination of the input image from the input node 301 and its enhanced version that contains created high frequency information (details). In one embodiment, the details are created in the detail creation module 320 where image blocks 311 are fed in from the block receiving module 310 (that divides an input image into blocks), and the output detail blocks 331 are generated by the detail construction module 330 in which more output detail blocks are constructed to form a whole image details. In one embodiment, the output, which may be pixels or image blocks 331 (size P×Q), are generally smaller than the input image size of blocks 311 (size M×N), where P, Q, M and N are positive integers.

In one example embodiment, if a regular image up-conversion block is added in front of system 300, it may be applied to generate UD images (still images or video frames) using lower resolution images as the input images, which is an advanced image up-conversion/up-scaling/super-resolution system. In one example embodiment, up-converted UD images contain additional image details that cannot be obtained by conventional image up-conversion algorithms. As a result, in one or more embodiments the image quality (sharpness, fine details, etc.) may be greatly improved. In one embodiment, an application of system 300 may be implemented in a UD device or display on which a lower resolution movie may be received for display. If system 300 is not available on the UD device or display, the viewers may feel the image sharpness is poor or the image lacks delicate detail. Currently, UD video images (e.g., streaming video, movies, etc.) is available on the market, but UD video media (TV programming, web TV or video, Blu-ray discs and personal digital video) is extremely rare. Most of the video media is still FHD, HD or even SD. In one or more embodiments, to satisfy UD viewers' visual expectation, advanced image up-conversion (super-resolution) function is implemented using system 300.

In one embodiment, an application of the system 300 may be implemented in current HDTVs (or lower resolution TVs, devices, displays, etc.) to enhance (or restore) the image details of low quality SD, HD, FHD, UD or up-scaled UD images of poor (blurry or degraded) image details, such as the web video clips obtained from the Internet or digital video captured by personal camcorder or smart phone. Usually low quality SD, HD or FHD video clips' image details may be degraded or damaged due to data compression, insufficient lighting condition or limited performance of the video capture device. One or more embodiments provide system 300 as a versatile system that is able to achieve the required functions by different applications, either in hardware or software. In one example embodiment, applications for system 300 may include high performance image detail enhancement or restoration, image super-resolution, and advanced image up-conversion, etc. In one or more example embodiments, various applications of system 300 may be very useful if implemented as programmed hardware in UD devices and displays, HDTV products or as software used in PCs or mobile devices (tablets, PCs, wearable devices, smart phones, etc.).

In one embodiment, the system 300 produces the output image at the output node 340, which is a combination of the input image from the input node 301 and its enhanced version that contains enhanced and restored high frequency information (details). The detail description of the detail creation module 320 for one or more embodiments follows in combination with FIGS. 4-11.

Figure 4:
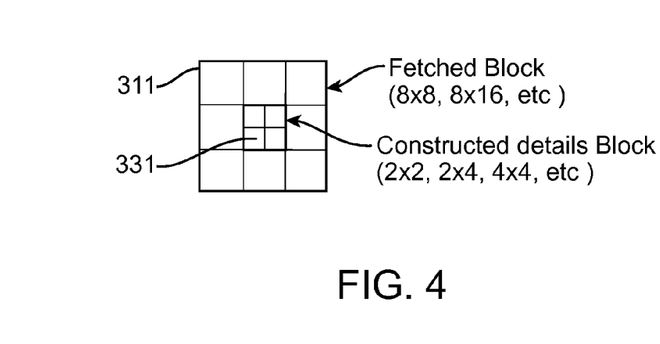
FIG. 4 shows an example relationship between an external image block and an internal image block, according to an embodiment.

FIG. 4 shows an example relationship between an external image block (made up of an M×N block 311) and an internal image block (made up of a P×Q block 331) that are center-aligned with one another, according to an embodiment. The common image block sizes and the spatial relationship between the input image block 311 and the output image block 331 is demonstrated in FIG. 4. In one embodiment, the output image block 331 is located as a center portion within the input image block 311. In one embodiment, while the output image block 331 is being created, both the image information inside the output block 331 region and the information outside the output block 331 (within the input block 311) are used. In one example embodiment, the image information within the region-of-interest (output block 331/input block 311) is considered to be related to (or inferable from) that of the surrounding region (input block 311/output block 331). In one embodiment, the output image blocks 331 are "patched" up or combined by the construction module 330 to generate the whole output details image, then the final result is obtained by combining the created details and the input image with the mixer 335 (FIG. 3).

Figure 5:
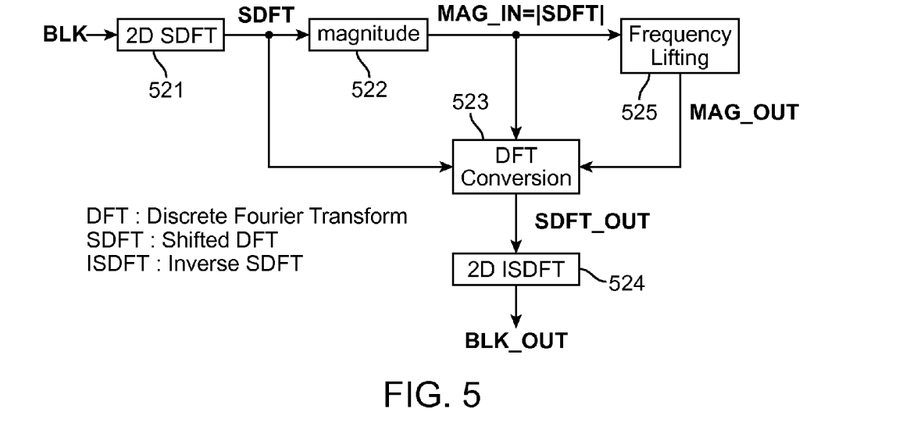
FIG. 5 shows an example detail creation block, according to an embodiment.

FIG. 5 shows an example detail creation block 520 that may be implemented in system 300 as the detail creation module 320, according to an embodiment. In one embodiment, the detail creation block 520 may include a 2D shifted discrete Fourier transform (SDFT) module 521 that receives an input image block from the receiving module 310 (FIG. 3), a magnitude module 522, a DFT conversion module 523, a frequency lifting module 525 and a 2D inverse SDFT (ISDFT) module 524 that outputs the output image block that is input to the construction module 330.

Figure 6:
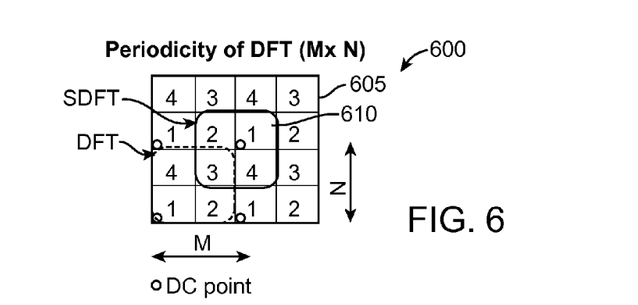
FIG. 6 shows an example of periodicity for a transform, according to an embodiment.
Figure 7:
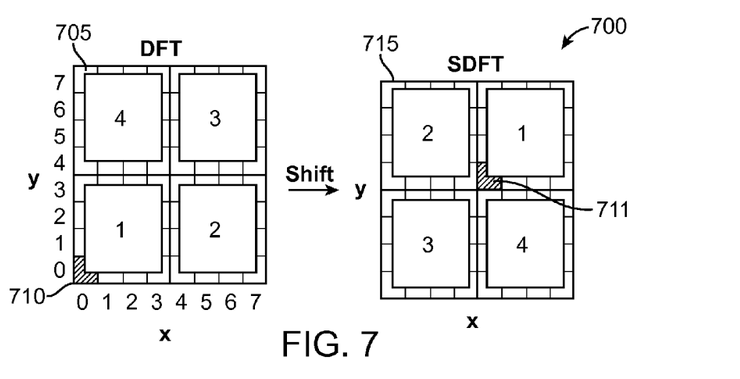
FIG. 7 shows an example transform shifting operation, according to an embodiment.

In one embodiment, the input image blocks are first processed in the 2D SDFT module 521 to compute the DFT coefficients (in a matrix), which are then shifted. In one embodiment, the shifting of the DFT coefficients is illustrated in FIGS. 6 and 7 as described below. In one embodiment, the shifted DFT coefficients are provided as the input to the frequency lifting module 525, and DFT conversion module 523 for distance calculation, coefficient frequency lifting and coefficient conversion, respectively. It should be noted that the shifted DFT (SDFT) is a complex number which may be represented as $SDFT=SDFT_R+j \cdot SDFT_I$, and then the magnitude of the SDFT is calculated (MAG_IN) as $|SDFT|=(SDFT_R^2+SDFT_I^2)^{1/2}$, or MAG_IN=|SDFT|, where R represents the real portion and I represents the imaginary portion. Inside the frequency lifting module 525, DFT coefficient's (a component in a frequency domain, equivalent to a point in a 2D coordinate) distances to a zero-frequency coefficient (equivalent to the origin of the 2D coordinate) are obtained by using the coefficient's row and column indexes (equivalent to the coordinates of a point) in a matrix. In one embodiment, the computed distances are fed as input to two processing sub-blocks: the coefficient conversion module 523 and the frequency lifting module 525.

In one embodiment, in the frequency lifting module 525, some (e.g., one or more, several, all, etc.) frequency components are lifted to a higher frequency location in the spectrum. In one example embodiment, if the 2D DFT coefficients/spectrum are plotted as a curved surface in a 3D Cartesian coordinate (the origin represents the zero-frequency position), the frequency lifting processing makes the off-center peaks move outward from the origin and makes the slope of the central peak expand outward. The details of the frequency lifting module 525 processing are described below with reference to FIGS. 6-9. In one embodiment, the coefficient conversion module 523 receives the outputs from the three processing blocks: the 2D SDFT module 521, the magnitude module 522 and the frequency lifting module 525, and computes the new/modified 2D DFT coefficients. The computation details of the coefficient conversion module 523 are described below.

In one embodiment, in the 2D ISDFT, the new 2D DFT coefficients are first shifted and then inversely transformed to a spatial domain signal—with the modified image block (size M×N), which is also the output of the detail creation block 520 (as implemented as the detail creation module 320, FIG. 3).

FIG. 6 shows an example 600 of a matrix 605 of periodicity for a transform, according to an embodiment. In one embodiment, the matrix 600 is an M×N matrix. In one example, the DFT coefficients have an origin in the lower left corner of each group of coefficients for distance calculation (DC). In one embodiment, the SDFT shifts the origin to the center of the SDFT block 610.

FIG. 7 shows an example 700 of transform shifting operation, according to an embodiment. In one embodiment, example 700 illustrates the shifting of DFT coefficients for the purpose of computing the distance of a frequency domain component to the zero frequency point. In one example, 2D DFT is generally achieved through a 2D FFT (Fast Fourier Transform) algorithm which generates the DFT coefficients in a matrix format as shown in example 700 as the DFT matrix 705 and the SDFT matrix 715. In one example embodiment, each matrix element is a frequency component. The x, y coordinates represent the column and row indices, respectively. In one example embodiment, for the DFT coefficient matrix 705 that is not shifted, the four corner elements contribute to the zero-frequency component.

In one example, to illustrate the coefficient shifting, the coefficient matrix is evenly divided into four (4) regions as shown in the DFT matrix 705 graph and the SDFT matrix 715 graph. In one example embodiment, after coefficient shifting, the new coefficient matrix (SDFT matrix 715) may be considered to be obtained by exchanging the four regions' positions. In one example embodiment, region 1 exchanges its position with region 3, while region 2 exchanges its position with region 4. In one embodiment, the coefficient shifting moves the zero-frequency position 710 to the center of the matrix 711 (equivalent to the origin of a 2D coordinate), which may simplify the distance calculation and also make the frequency lifting module 525 processing easier to understand.

Figure 8:
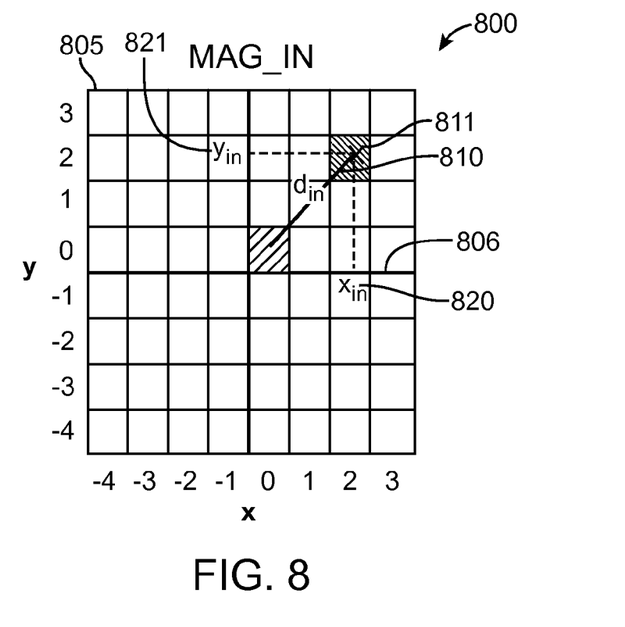
FIG. 8 shows an example diagram for a distance calculation, which is related to the frequency component, according to an embodiment.

FIG. 8 shows an example diagram 800 for describing a distance calculation, according to an embodiment. After DFT coefficients shifting, the zero-frequency is moved to the center of the matrix 805. Inside the frequency lifting module 525, the distance 810 from a frequency component 811 to the zero-frequency point in the quadrant 806 needs to be calculated first. The zero-frequency point is treated as the origin of a 2D coordinate and the matrix elements as the points on the coordinate. In one example, the position of the coefficient 811 is indicated by $x_{in}$ 820 and $y_{in}$ 821. In one embodiment, for a frequency component's position, the coordinates of the corresponding point, are obtained as in the equation $x_{in}=Col-Col(0)$, $y_{in}=Row-Row(0)$.

Figure 9:
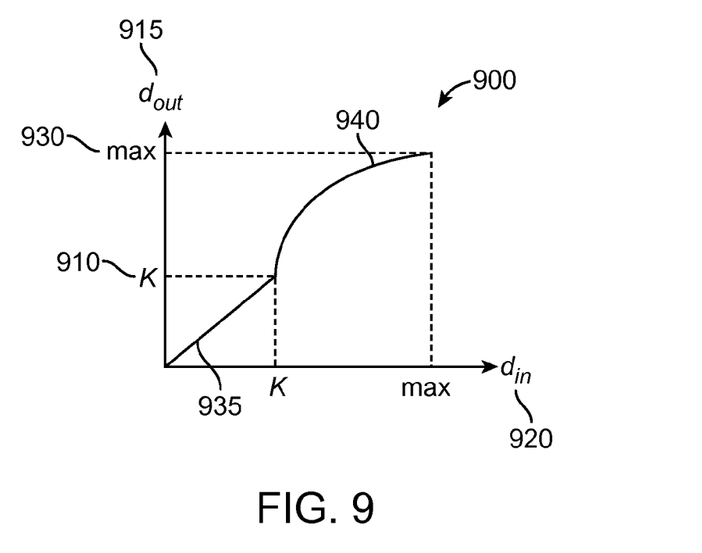
FIG. 9 shows an example diagram for a transfer function for frequency lifting, according to an embodiment.

FIG. 9 shows an example diagram 900 for a transfer function for frequency lifting, according to an embodiment. In one example embodiment, in the equation $x_{in}=Col-Col(0)$, $y_{in}=Row-Row(0)$, $x_{in}$ and $y_{in}$ are the coordinates of a frequency component while Col and Row are its matrix indices. Similarly, Col(0) and Row(0) are the matrix indices of the zero-frequency component.

In one embodiment, after DFT coefficients shifting, the zero-frequency is moved to the center of the matrix. In one embodiment, to calculate the distance from a frequency component to the zero-frequency point, the zero-frequency point is treated as the origin (i.e., (0,0) point) of a 2D coordinate and the matrix elements as the points on the coordinate as illustrated in FIG. 9 as an example with M=N=8. Note that the indices of the MAG_IN matrix becomes $$x_{in} = -\frac{N}{2}, \ldots, 0, \ldots, \frac{N}{2}-1 \text{ and}$$

$$y_{in} = -\frac{M}{2}, \ldots, 0, \ldots, \frac{M}{2} - 1,$$

where it is assumed that N and M are even numbers, and the same for the MAG_OUT matrix indices. In one embodiment, for all $$x_{in} = -\frac{N}{2}, \ldots, 0, \ldots, \frac{N}{2} - 1 \text{ and}$$

$$y_{in} = -\frac{M}{2}, \ldots, 0, \ldots, \frac{M}{2} - 1,$$

the distance $d_{in}$ 920 to zero-frequency coefficient is calculated as follows $$d_{in} = \sqrt{x_{in}^2 + y_{in}^2}$$

In one embodiment, the frequency lifting module 525 (FIG. 5) lifts the frequency components to higher frequency positions based on their distances to zero-frequency (the origin in FIG. 8) component. However, if the matrix element is considered as the arrow head of a vector, the frequency lifting operation does not change the direction of the vector. In one embodiment, only the vector's length (the frequency component's distance to the origin) may be increased. Basically, this distance $d_{out}$ 915 change may be mathematically expressed as follows $$d_{out} = \text{curve}(d_{in}).$$

In one embodiment, the 'curve' in above formula is a pre-determined transfer function, a typical example of which is shown as curve 940 that is plotted in the graph 900. In one example embodiment, the x/horizontal axis represents the input distance $d_{in}$ 920 and the y/vertical axis represents the output distance $d_{out}$ 915. In one embodiment, the transfer function may be created using a piecewise function as shown as the line 935 and curve 940. In one example embodiment, when the input distance $d_{in}$ 920 is smaller than a value K 910, the distance will not be changed. Therefore, in one example the straight line 935 has a slope of 1. In one example embodiment, when the input distance $d_{in}$ 920 is larger than K 910, the output distance $d_{out}$ 915 will be increased and be larger than $d_{in}$ 920. In one example embodiment, the distance increase may be determined by a nonlinear function, e.g., a 2nd-order polynomial function. In one example embodiment, the highest-frequency component, which has the maximum distance 930, will not be lifted. In a normal 2D DFT spectrum, the lower-frequency components (matrix elements closer to the center) generally have a high value (the magnitude of a DFT component) than higher-frequency components. Therefore, in one example embodiment when a lower-frequency component is lifted to a higher-frequency position, the high-frequency information is created. In one embodiment, new high-frequency information (new image details) may be created to restore the missing/damaged image details. In one embodiment, as the high-frequency components are created or inferred from the low-frequency information, the new image details look more 'real' or 'meaningful' and may contain less artifacts compared to conventional super resolution (SR) methods.

In one embodiment, after a frequency component is lifted to a higher frequency position, its new position (coordinates) may be determined in the following equations:

$$x_{out} = x_{in} * \frac{d_{out}}{d_{in}}$$

$$y_{out} = y_{in} * \frac{d_{out}}{d_{in}},$$

which is to lift the DFT frequency components into the same angle. Note that $$\frac{y_{in}}{x_{in}} = \frac{y_{out}}{x_{out}}.$$

It should be noted that the new coordinates or the new positions are usually not the correct coordinates or positions defined by the DFT coefficient matrix. Therefore, in one example embodiment, 2D interpolation or re-sampling is used to compute the DFT coefficient on the 'right' positions based on the shifted grid and modified DFT values. Once the target horizontal and vertical frequency components have been calculated, the frequency components from MAG_IN are updated to MAG_OUT by the frequency lifting module 525 (FIG. 5) process (or frequency component mapping) by the equation below:

$$\text{MAG\_OUT}(x_{out}, y_{out}) = \text{MAG\_IN}(x_{in}, y_{in}).$$

In one embodiment, it may be easily understood that the above equation represents a mapping process among different frequency positions (locations) in the frequency domain. The mapping may be either backward or forward interpolation, to interpolate a new pixel frequency magnitude (MAG_OUT) by nearest neighbor pixel or weighted neighbor pixels from the input frequency magnitude block. In one embodiment, after obtaining the enhanced frequencies, a ratio may be calculated with the enhanced frequency and the original frequency at that location. In one example embodiment, then the enhanced DFT (including both real and imaginary parts) may be obtained by multiplying the ratio to the SDFT result as follows:

$$\text{SDFT\_OUT} = SDFT \cdot \frac{\text{MAG\_OUT}}{\text{MAN\_IN}}.$$

In one embodiment, a modified matrix of DFT coefficients is obtained through the frequency lifting process of the frequency lifting module 525 (FIG. 5). In one example embodiment, before the matrix may be transformed back to an image block in spatial domain through the ISDFT module 524, its elements need to be shifted in the opposite way of the one shown in FIG. 7.

Figure 10:
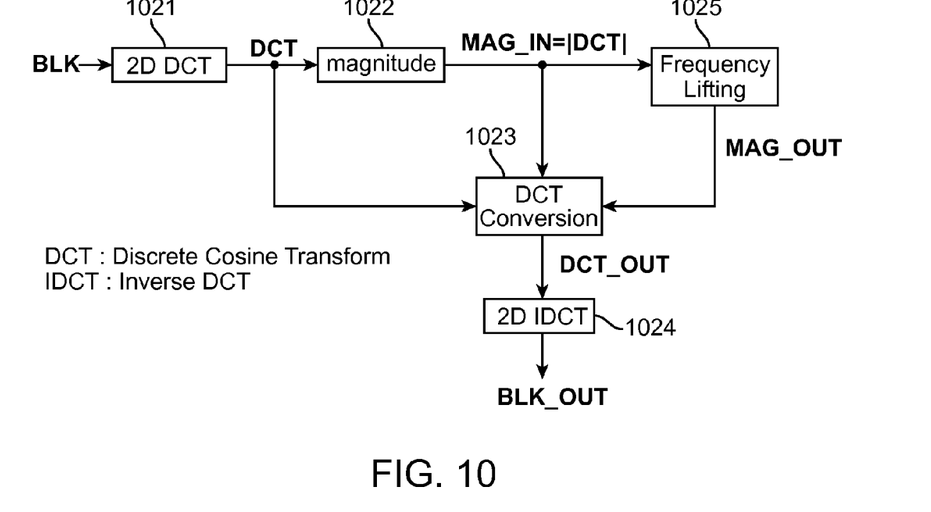
FIG. 10 shows another example detail creation block, according to an embodiment.

FIG. 10 shows another example detail creation block 1020, according to an embodiment. In one embodiment, the detail creation block 1020 may be implemented in the detail creation module 320 (FIG. 3). In one example embodiment, the detail creation block 1020 implements a DCT process. In one embodiment, the detail creation block 1020 includes a 2D DCT module 1021, a magnitude module 1022, a frequency lifting module 1025, a DCT conversion module 1023 and 2D inverse DCT (2D IDCT) module 1024.

Figure 11:
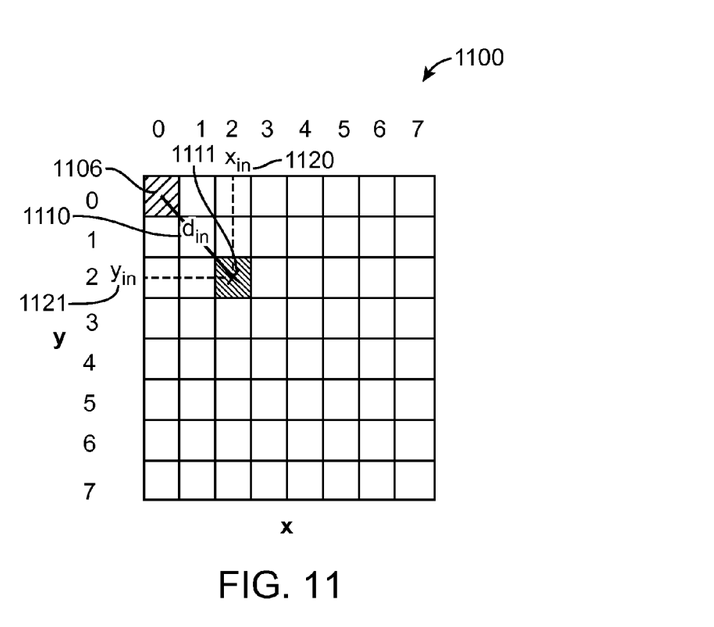
FIG. 11 shows an example diagram for depicting a distance determination that is related to the frequency component, according to an embodiment.

In one embodiment, the main function of the frequency lifting module 1025 is to lift the given frequency in MAG_IN and generate the lifted DCT magnitude matrix DCT_OUT. In one example embodiment, for all $x_{in} = 0, 1, \ldots, M-1$ and $y_{in} = 0, 1, \ldots, N-1$, the distance to the zero-frequency coefficient (equivalent to the origin of the 2D coordinate) is calculated using the coefficient's row and column indexes (equivalent to the coordinates of a point) as:

$$d_{in}=\sqrt{x_{in}^2+y_{in}^2},$$

which is related the frequency component (e.g., as depicted in FIG. 11).

Inside the frequency lifting module 1025, the distance is fed as input to the transfer function to decide the upper target lifting frequency distance to zero-frequency component as $$d_{out}=\text{curve}(d_{in}),$$

where curve represents a monotonically increasing transfer function. In one example embodiment, the transfer function is shown in FIG. 9, which also shows that that frequency ranges are set up such as $d_{in}<K$ whose components are not lifted.

In one embodiment, once the target lifting factor has been calculated then the associated horizontal and vertical DCT frequency components are determined as follows:

$$x_{out} = x_{in} \cdot \frac{d_{out}}{d_{in}} \; \& \; y_{out} = y_{in} \cdot \frac{d_{out}}{d_{in}},$$

which is implemented to lift the DCT frequency components into the same angle. Note that $$\frac{y_{in}}{x_{in}} = \frac{y_{out}}{x_{out}}.$$

In one embodiment, once the target horizontal and vertical frequency components have been calculated, the frequency components are updated from MAG_IN to MAG_OUT by the frequency lifting module 1025 as:

$$\text{MAG\_OUT}(x_{out},y_{out})=\text{MAG\_IN}(x_{in},y_{in}).$$

Note that, in the frequency lifting module 1025, some (e.g., one or more, several, all, etc.) frequency components are lifted to a higher frequency location in the spectrum. In one example embodiment, if the 2D DCT coefficients/spectrum are plotted as a curved surface in a 3D Cartesian coordinate (the origin represents the zero-frequency position), the frequency lifting processing makes the off-center peaks move outward from the origin and make the slope of the central peak expand outward.

In one embodiment, MAG_IN and MAG_OUT from the frequency lifting module 1025 are then provided to the DCT conversion module 1023, whose output is:

$$\text{DCT\_OUT} = DCT \cdot \frac{\text{MAG\_OUT}}{\text{MAN\_IN}}.$$

In one embodiment, in the 2D IDCT module 1024, the new 2D DCT coefficients (DCT_OUT) are inversely transformed to spatial domain signal—the same size block as BLK (M×N), which is the output of the detail creation module 320 (FIG. 3).

FIG. 11 shows an example diagram 1100 for depicting a distance determination that is related to the frequency component, according to an embodiment. In one example embodiment, the operation of the DCT conversion module 1023 (FIG. 10) is to combine the original phase information with the magnitude change. In one embodiment, the 2D origin 1106 for the x and y coordinates is used to determine the distance $d_{in}$ 1110 to the coefficient 1111 based on $x_{in}$ 1120 and $y_{in}$ 1121.

Figure 12:
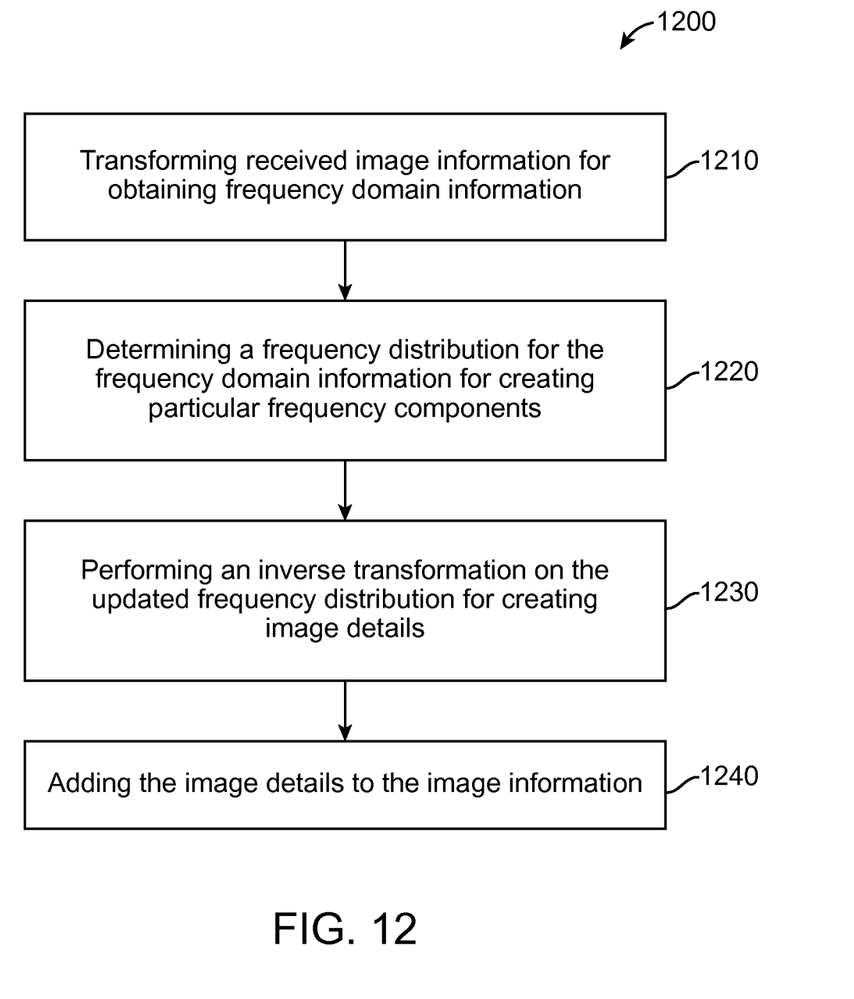
FIG. 12 shows a block diagram for a details creation process, according to an embodiment.

FIG. 12 shows a block diagram for a details creation process 1200, according to an embodiment. In one embodiment, in block 1210, received image information (e.g., M×N blocks 311, FIG. 3) is transformed (e.g., using DFT, SDFT, DCT, etc.) for obtaining frequency domain information (e.g., using a processor device). In one embodiment, in block 1220 a frequency distribution for the frequency domain information is determined for creating particular frequency components. In one embodiment, in block 1230 an inverse transformation is performed on the updated frequency distribution for creating one or more output image blocks. In one embodiment, in block 1240 the one or more output image blocks are combined to create image details, which are added to the image (input image). In one embodiment, the process 1200 implements processing using system 300.

In one embodiment, process 1200 may include inputting the image (e.g., a lower resolution image, such as SD, HD, FHD, UD, up-scaled-UD, etc.) to a higher resolution image, and dividing the inputted image into the image information that comprises one or more input image blocks. In one embodiment, an input image block (M×N) has a block size larger than a size of an output image (e.g., pixels, P×Q block, etc.). In one embodiment, the frequency domain information comprises transform coefficients. In one embodiment, the particular frequency components may be created in process 1200 based on: performing frequency lifting on the transform coefficients for lifting some (e.g., one or more, several, all, etc.) frequency components to a higher frequency location in a transform spectrum; and converting the transform coefficients to modified transform coefficients.

In one embodiment, process 1200 may include creating the particular frequency components based on: shifting the transform coefficients position in a matrix; using the shifted transform coefficients for determining distances for coefficients to a zero-frequency coefficient position using associated coefficient row and column indexes; performing frequency lifting on the transform coefficients based on the determined distances for lifting some (one or more, several, all, etc.) frequency components to a higher frequency location in a transform spectrum; and converting the transform coefficients to modified transform coefficients.

In one embodiment, process 1200 may include moving the zero-frequency coefficient position to a center of the matrix after the shifting, where the zero-frequency coefficient position is used as an origin of a two-dimensional coordinate, and matrix elements are used as points on the two-dimensional coordinate.

In one embodiment, in process 1200, determining distances for the coefficients may be based on a pre-determined transfer function. In one embodiment, in process 1200, an output image including the created image details and the input image is displayed on an electronic device, e.g., an electronic device 52, FIG. 1). In one embodiment, process 1200 may perform processing on one of a local television device, a set-top-box device, and a network server device.

One embodiment includes an image enhancement device (e.g., an electronic device 52, FIG. 1, etc.) for generating an enhanced image by a process according to process 1200, or any portion thereof.

Figure 13:
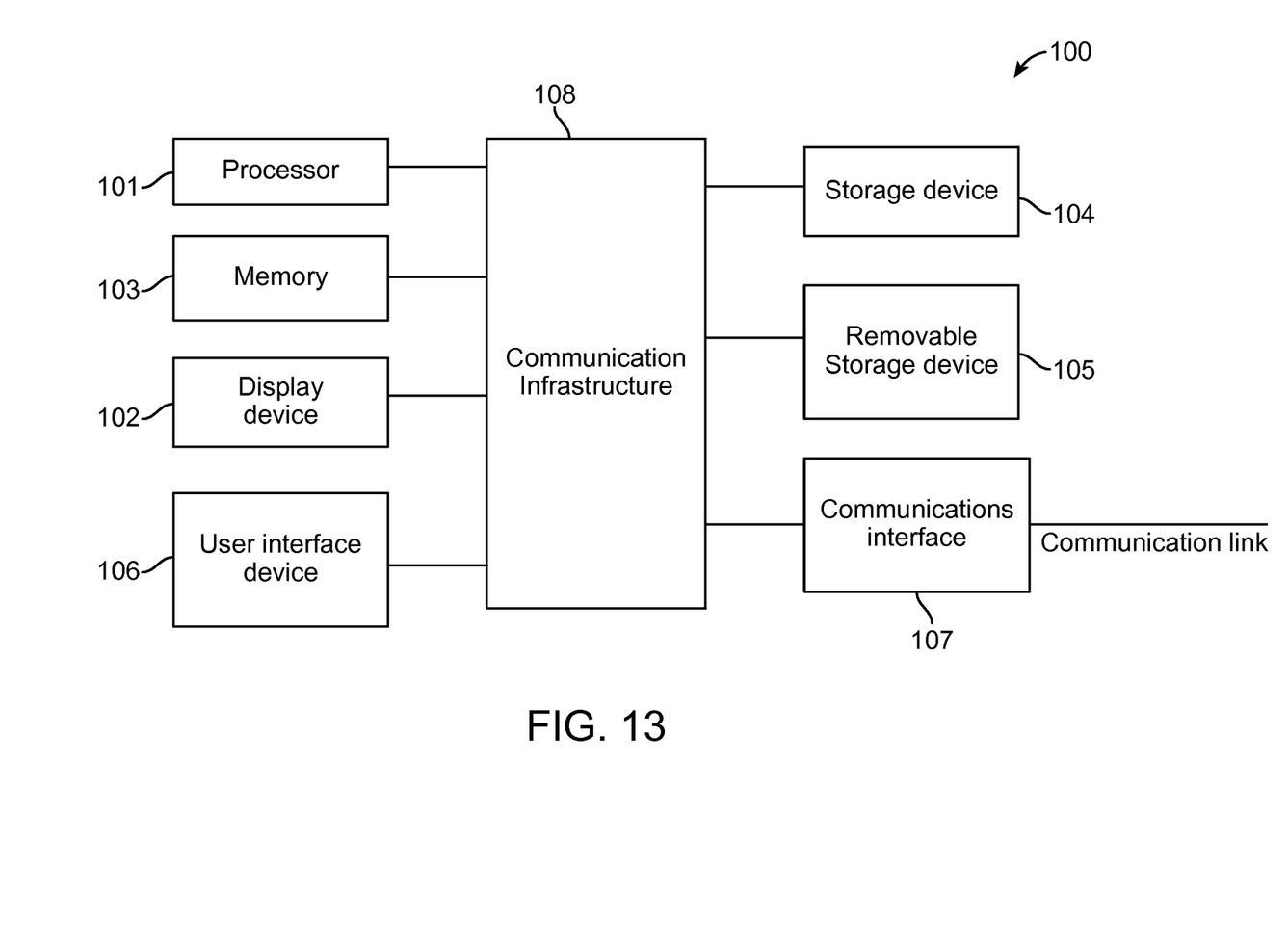
FIG. 13 is an exemplary high-level block diagram showing an information processing system comprising a computer system useful for implementing disclosed embodiments.

FIG. 13 is a high-level block diagram showing an information processing system comprising a computer system 100 useful for implementing the disclosed embodiments. The computer system 100 includes one or more processors 101, and can further include an electronic display device 102 (for displaying graphics, text, and other data), a main memory 103 (e.g., random access memory (RAM)), storage device 104 (e.g., hard disk drive), removable storage device 105 (e.g., removable storage drive, removable memory module, a magnetic tape drive, optical disk drive, computer readable medium having stored therein computer software and/or data), user interface device 106 (e.g., keyboard, touch screen, keypad, pointing device), and a communication interface 107 (e.g., modem, a network interface (such as an Ethernet card), a communications port, or a PCMCIA slot and card). The communication interface 107 allows software and data to be transferred between the computer system and external devices. The system 100 further includes a communications infrastructure 108 (e.g., a communications bus, cross-over bar, or network) to which the aforementioned devices/modules 101 through 107 are connected.

Information transferred via communications interface 107 may be in the form of signals such as electronic, electromagnetic, optical, or other signals capable of being received by communications interface 107, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer readable medium may comprise computer readable information in a transitory state medium such as a network link and/or a network interface, including a wired network or a wireless network, that allow a computer to read such computer readable information. Computer programs (i.e., computer control logic) are stored in main memory and/or secondary memory. Computer programs may also be received via a communications interface. Such computer programs, when executed, enable the computer system to perform the features as discussed herein. In particular, the computer programs, when executed, enable the processor multi-core processor to perform the features of the computer system. Such computer programs represent controllers of the computer system.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   receiving input image information;
   determining, by a processor device, enhancement information based on:
      transforming the received input image information to obtain frequency domain information;
      performing an inverse transformation on an updated frequency distribution to create one or more output image blocks; and
      combining the one or more output image blocks to create the enhancement information; and
   mixing the enhancement information with the input image information to generate an enhanced image.

2. The method of claim 1, wherein mixing the enhancement information with the input image information comprises:
   mixing the image details with the input image.

3. The method of claim 2, further comprising:
   inputting the input image; and
   dividing the input image into the input image information that comprises one or more input image blocks.

4. The method of claim 3, wherein an input image block has a block size larger than a block size of an output image block.

5. The method of claim 2, further comprising:
   determining, by the processor device, a frequency distribution for the frequency domain information to create particular frequency components;
   wherein the frequency domain information comprises transform coefficients, and the particular frequency components are created based on:
      performing frequency lifting on the transform coefficients for processing one or more frequency components to a higher frequency location in a transform spectrum; and
      converting the transform coefficients to modified transform coefficients.

6. The method of claim 5, wherein transforming received input image information comprises using one of discrete Fourier transform processing and discrete cosine transform processing.

7. The method of claim 2, wherein the frequency domain information comprises transform coefficients, and the particular frequency components are created based on:
   shifting the transform coefficients position in a matrix;
   using the shifted transform coefficients to determine distances for coefficients to a zero-frequency coefficient position using associated coefficient row and column indexes;
   performing frequency lifting on the transform coefficients based on the determined distances to lift one or more frequency components to a higher frequency location in a transform spectrum; and converting the transform coefficients to modified transform coefficients.

8. The method of claim 7, further comprising:
moving the zero-frequency coefficient position to a center of the matrix after said shifting, wherein the zero-frequency coefficient position is used as an origin of a two-dimensional coordinate, and matrix elements are used as points on the two-dimensional coordinate.

9. The method of claim 8, wherein determining distances for the coefficients are based on a pre-determined transfer function.

10. The method of claim 2, wherein an output image comprising the image details and the input image is displayed on an electronic device.

11. The method of claim 10, wherein the electronic device comprises a television device, a monitor device, a computing device or a mobile computing device.

12. The method of claim 2, wherein the processor device performs processing on one of a local television device, a set-top-box device, and a network server device.

13. An image enhancement device configured to generate an enhanced image by a process according to the method of claim 1.

14. A system comprising
a memory device configured to store input image information; and
a processor device configured to:
receive the input image information from the memory device; and
determine enhancement information by being configured to:
transform the received input image information to obtain frequency domain information;
perform an inverse transformation on an updated frequency distribution to create one or more output image blocks; and
combine the one or more output image blocks to create the enhancement information; and
a mixer configured to mix the enhancement information with the input image information to generate an enhanced image.

15. The system of claim 14, wherein the the processor device is further configured to:
combine the one or more output image blocks to create the enhancement information that comprises image details; and the mixer is configured to mix the image details with the input image.

16. The system of claim 15, wherein the processor device is further configured to
input the input image and to divide the input image into the input image information that comprises one or more input image blocks.

17. The system of claim 16, wherein an input image block has a block size larger than a block size of an output image block.

18. The system of claim 15, wherein the frequency domain information comprises transform coefficients, and the processor device is configured to:
determine a frequency distribution for the frequency domain information to create particular frequency components, perform frequency lifting on the transform coefficients to shift one or more frequency components to a higher frequency location in a transform spectrum, and
convert the transform coefficients to modified transform coefficients.

19. The system of claim 15, wherein the frequency domain information comprises transform coefficients, and the particular frequency components are created by the processor device that is further configured to:
shift the transform coefficients position in a matrix;
use the shifted transform coefficients to determine distances for coefficients to a zero-frequency coefficient position using associated coefficient row and column indexes;
perform frequency lifting on the transform coefficients based on the determined distances to lift one or more frequency components to a higher frequency location in a transform spectrum; and
convert the transform coefficients to modified transform coefficients.

20. The system of claim 19, wherein the processor device is further configured to move the zero-frequency coefficient position to a center of the matrix after shifting the transform coefficients position in the matrix, the zero-frequency coefficient position is used as an origin of a two-dimensional coordinate, and matrix elements are used as points on the two-dimensional coordinate.

21. The system of claim 20, wherein the distances for the coefficients are determined, by the processor device, based on a pre-determined transfer function.

22. The system of claim 21, wherein the processor device is configured to transform received input image information based on one of a discrete Fourier transform and a discrete cosine transform.

23. The system of claim 15, wherein an output image that comprises the image details and the input image is displayed on an electronic device that comprises a television device, a monitor device, a computing device or a mobile computing device.

24. The system of claim 15, wherein the processor device is configured to perform processing on a television device, a set-top-box device, or a network server device.

25. A non-transitory computer-readable medium having instructions which when executed on a computer perform a method comprising:
receiving, by the computer, input image information;
determining, by one or more processors, enhancement information based on:
transforming the received input image information to obtain frequency domain information;
performing an inverse transformation on an updated frequency distribution to create one or more output image blocks; and
combining the one or more output image blocks to create the enhancement information; and
mixing the enhancement information with the input image information to generate an enhanced image.

26. The non-transitory computer-readable medium of claim 25, wherein mixing the enhancement information with the input image information comprises:
mixing the image details with the input image.

27. The non-transitory computer-readable medium of claim 26, wherein the computer performs the method further comprising:
receiving the input image; and
dividing the input image into the input image information that comprises one or more input image blocks, and an input image block has a block size larger than a block size of an output image block.

28. The non-transitory computer-readable medium of claim 26, wherein the computer performs the method further comprising:

determining, by the one or more processors, a frequency distribution for the frequency domain information to create particular frequency components, the frequency domain information comprises transform coefficients, and the particular frequency components are created based on:

performing, by the one or more processors, frequency lifting on the transform coefficients to lift one or more frequency components to a higher frequency location in a transform spectrum; and converting the transform coefficients to modified transform coefficients.

29. The non-transitory computer-readable medium of claim 26, wherein the frequency domain information comprises transform coefficients, and the particular frequency components are created based on:

shifting, by the one or more processors, the transform coefficients position in a matrix;

using, by the one or more processors, the shifted transform coefficients to determine distances for coefficients to a zero-frequency coefficient position using associated coefficient row and column indexes;

performing, by the one or more processors, frequency lifting on the transform coefficients based on the determined distances for lifting one or more frequency components to a higher frequency location in a transform spectrum; and converting, by the one or more processors, the transform coefficients to modified transform coefficients.

30. The non-transitory computer-readable medium of claim 29, wherein the computer performs the method further comprising:

moving, by the one or more processors, the zero-frequency coefficient position to a center of the matrix after said shifting, wherein the zero-frequency coefficient position is used as an origin of a two-dimensional coordinate, and matrix elements are used as points on the two-dimensional coordinate.

31. The non-transitory computer-readable medium of claim 30, wherein determining distances for coefficients are based on a pre-determined transfer function.

32. The non-transitory computer-readable medium of claim 31, wherein transforming received input image information comprises the one or more processors performing discrete Fourier transform processing or discrete cosine transform processing.

33. The non-transitory computer-readable medium of claim 26, wherein an output image comprising the image details and the input image is displayed on an electronic device, and the electronic device comprises a television device, a monitor device, a computing device or a mobile computing device.

34. The non-transitory computer-readable medium of claim 26, wherein the computer performs processing on a local television device, a set-top-box device, or a network server device.

* * * * *